United States Patent [19]

Lundquist

[11] 4,452,420

[45] Jun. 5, 1984

[54] COMPENSATING CORE PIN FOR PLASTIC INJECTION MOLDS

[76] Inventor: Lynn Lundquist, 10833 NE. Russell St., Portland, Oreg. 97220

[21] Appl. No.: 431,043

[22] Filed: Sep. 30, 1982

[51] Int. Cl.³ ............................................. B29C 1/06
[52] U.S. Cl. ................................. 249/175; 249/68; 249/142; 425/107; 425/577
[58] Field of Search ................ 425/107, 577; 249/68, 249/142, 175

[56] References Cited

U.S. PATENT DOCUMENTS

| | | | |
|---|---|---|---|
| 2,134,829 | 11/1938 | McWane | 249/142 X |
| 2,237,606 | 4/1941 | McWane | 249/142 X |
| 2,361,348 | 10/1944 | Dickson et al. | 18/30 |
| 2,440,144 | 4/1948 | Hosking | 18/45 |
| 2,508,865 | 5/1950 | Lund | 249/68 X |
| 2,607,080 | 8/1952 | Stewart | 249/68 |
| 2,822,578 | 2/1958 | Lobell | 18/42 |
| 2,825,093 | 3/1958 | High | 18/42 |
| 3,060,509 | 10/1962 | McCubbins, Jr. | 18/42 |
| 3,315,317 | 4/1967 | Winkler | 18/42 |

*Primary Examiner*—Thomas P. Pavelko
*Attorney, Agent, or Firm*—Glen A. Collett

[57] ABSTRACT

A core pin for use in a plastic injection mold for forming a hole through a part as it is formed in the mold. A shaft is longitudinally slidable in one of the base members of the mold and extends through the cavity of the mold and abuts the inner face of the opposing base member. A spring biases the shaft toward the second base member. When the mold is open the shaft has a small amount of positive clearance. When the mold closes the spring is compressed and the shaft has zero clearance against the inner face of the second base member, regardless of dimensional changes of the mold.

15 Claims, 6 Drawing Figures

COMPENSATING CORE PIN FOR PLASTIC INJECTION MOLDS

BACKGROUND OF THE INVENTION

This invention relates to plastic injection molding equipment, and in particular to a core pin for use in plastic injection molds for forming a hole through a part as it is formed in the mold.

Conventional core pins are used in plastic injection dies when holes or small depressions are desired in the molded part. In order to accomplish this function the core pin projects into the cavity and prevents the plastic from filling the area occupied by the core pin. If a hole is desired completely through the molded part the core pin must seat tightly against the opposing face of the die.

The core pin is the accepted means of accomplishing this task. However, inasmuch as the core pin is a fixed length when mounted in the die there are certain limitations, particularly when it is used to form a hole completely through the part. The fit of the core pin is critical. Excess length will damage the die and/or the core pin. On the other hand, excess clearance will cause flash, giving a poorly formed or entirely closed hole.

Due to temperature changes within the die during operation, many dimensions and clearances change as the die reaches operating temperature. Not only can this cause flashing at full temperature, but it may damage the pin if the die is tightly clamped at ambient temperature.

All dies show slight dimensional change after long service from pressure and wear. This dimensional change frequently requires refitting or shimming the core pins to acceptable sealing functions.

In some applications it is desirable to use a removable insert for accomplishing the function of readily changing a logo, or the like. When removable inserts are used which have a sealing core pin, the clearance may vary slightly from insert to insert or because of clearances allowed for installation of the insert sections.

The usual result of these complications is that flashing occurs around the end of the intended hole. This flashing must be removed, which task often requires a secondary machining operation.

It is the general object of the present invention to provide a compensating core pin which automatically compensates for dimensional changes due to wear, temperature fluctuations, and variations in removable inserts.

Another object is to provide a core pin which is not required to be fit at close tolerances, but rather will automatically adjust to zero clearance in use.

Another object is to provide such a core pin in which the installation is simple and straightforward for the tool and die maker.

A further object is to provide such a core pin requiring only state of the art manufacturing skill.

These and other objects and advantages of the present invention, and the manner in which they are achieved, will become apparent in the following specification and claims.

SUMMARY OF THE INVENTION

In its basic concept the present invention is a core pin for use in a plastic injection mold for forming a hole through a part as it is formed in the mold. The mold includes opposing first and second base members positionable in either an open position wherein the base members are separated or in a closed position wherein the base members are together and form an injection molding cavity between the inner faces thereof. The core pin includes a shaft mounted longitudinally slidably in the first base member and extending through the cavity and abutting the inner face of the second base member when the base members are in the closed position. Spring means biases the shaft toward the second base member. This assures that the core pin will always seat tightly against the opposing face, regardless of dimensional changes in the mold.

DESCRIPTION OF THE PREFERRED EMBODIMENTS

The present invention is a spring-biased movable core pin used in plastic injection molds. This movement allows the pin to be fixed in the mold with a positive clearance to the mold face against which it is closing. By providing spring loading to the movable pin, the core pin will always close with zero clearance relative to the mold face opposite it. Thus, irrespective of mold wear or similarly caused dimensional changes, a plastic part using a core pin to form a hole will be assured of a flash-free opening.

Figure 1:
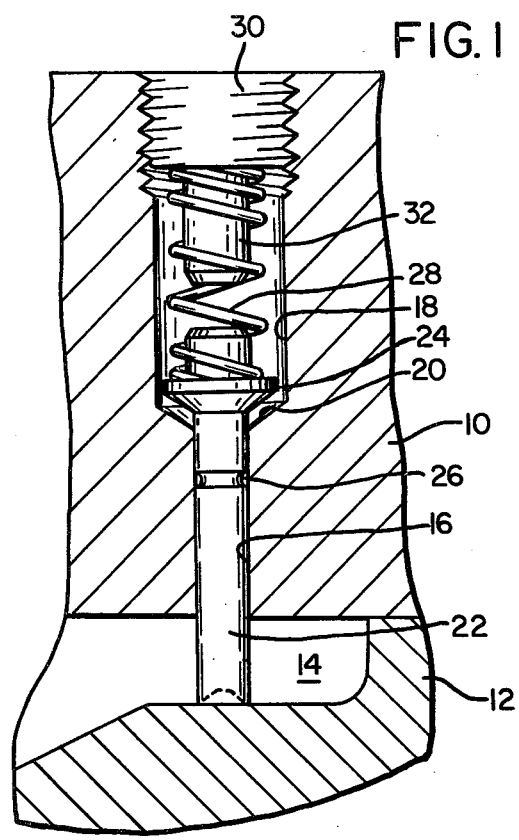
FIG. 1 is a fragmentary sectional plan view of an injection molding die, illustrating a fragmentary portion of a cavity therein, and illustrating the first embodiment of the compensating core pin of the present invention.

As shown in FIG. 1, an injection molding die includes a first base member 10, and an opposing second base member 12. An injection molding cavity 14 is formed between the inner faces of base members 10 and 12.

In the first base member 10 a stepped hole is drilled having a guide portion 16, and an enlarged component section 18. The outside end of hole 18 is threaded. A shoulder 20 is formed by the end of the drill bit at the base of hole 18.

The core pin includes a shaft 22 which is mounted in the first base member 10 and is longitudinally slidable in guide 16. A stop means, preferably a head 24, is provided on the shaft for engaging shoulder 20 of the base member to determine the limits of extension of the shaft. The shaft includes a circumferential groove 26 for receiving a packing or lubricating material to provide long-term lubrication between the shaft and guide 16.

Spring means, preferably coil spring 28, is provided to bias the shaft toward the second base member.

Cap means, preferably comprising a threaded member 30 screws into the threads in hole 18. The cap preferably includes a hex socket for turning by an Allen wrench. A projection 32 aligns spring 28 in the center of hole 18.

As shown in the drawing the mold is in its closed position. Head 24 is raised off of shoulder 20. This spacing is equal to the spacing that shaft 22 extends positively when the mold is in its open position.

Figure 2:
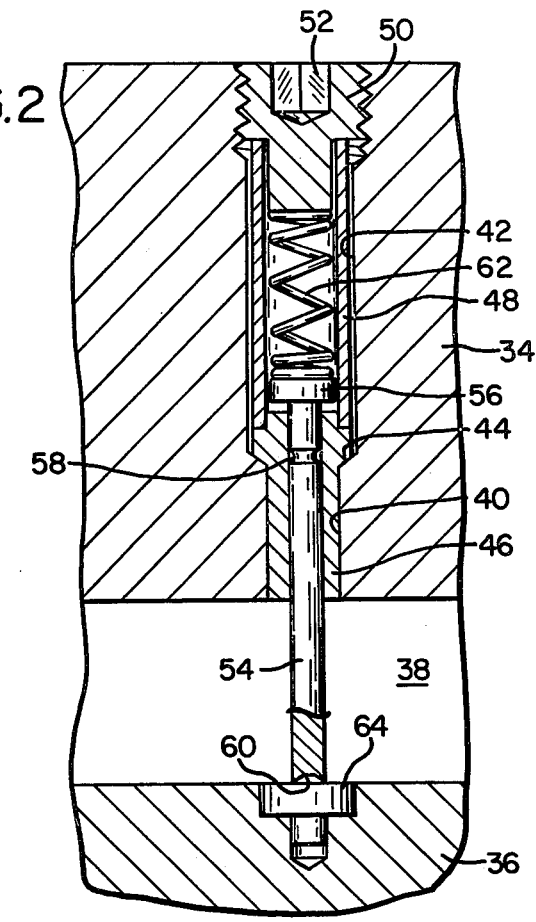
FIG. 2 is a fragmentary sectional plan view similar to FIG. 1 illustrating a second embodiment of the compensating core pin.

FIG. 2 shows a second embodiment of the compensating core pin of the present invention which is similar to that shown in FIG. 1. First and second base members 34 and 36 correspond to base members 10 and 12 respectively of FIG. 1. Between the base members the cavity 38 is formed. A stepped hole is provided in first base member 34. The stepped hole includes a lower portion 40 and an enlarged upper portion 42 having threads at the end thereof. A shoulder 44 is formed at the base of the upper portion of the hole.

In this embodiment of the core pin a cartridge design is employed for guiding the shaft and confining the spring. The guide 46 is mounted in the lower portion 40 of the hole abutting shoulder 44. Preferably the guide is milled flat with the cavity face, however this is a matter of design since a larger secondary hole could be formed partway into the part by extending the guide further into the cavity.

A tube 48 seats on guide 46, and both are secured into place by a cap or threaded member 50 similar to cap 30 in the first embodiment. A hex socket 52 is provided in the cap for tightening by an Allen wrench.

Shaft 54 is similar to shaft 22 of the first embodiment. Its rearward end terminates internally of base member 34 in a head 56. A lubricating channel 58 is provided on the shaft within guide 46 for providing lubrication between the shaft and the guide. The end of shaft 54 is indented at 60 to increase the pressure at which the periphery of the shaft engages the opposing mold face. This assures a positive contact and prevents high centering.

A spring 62 similar to spring 28 of the first embodiment is provided within tube 48, between cap 50 and head 56.

In the second base member 36 an insert 64 is provided. It is particularly advantageous to provide an insert made of steel for use in an aluminum mold in order to preserve the mold face against repeated openings and closings.

Figure 3:
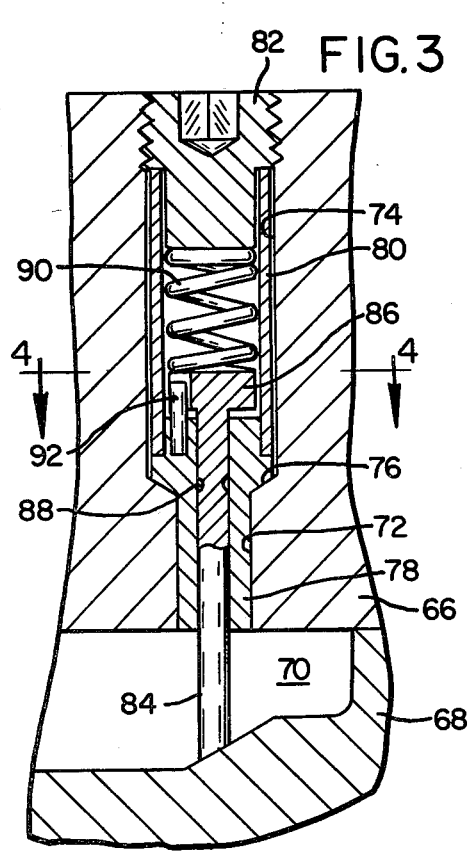
FIG. 3 is a fragmentary sectional plan view similar to FIGS. 1 and 2 illustrating a third embodiment of the compensating core pin which includes an indexing assembly.

FIG. 3 illustrates a third embodiment of the invention. Similar to the first two embodiments the first base member 66 and second base member 68 define a cavity 70 therebetween. A stepped hole is provided in the first base member having a lower portion 72 and an enlarged upper portion 74, with a shoulder 76 being formed at the lower end of the upper portion. The guide 78 similar to guide 46 in the second embodiment is mounted in the lower portion of the hole abutting shoulder 76. A tube 80 is mounted on the guide and secured in place by a cap 82 similar to the previous embodiment.

A shaft 84 similar to shaft 54 extends through the mold cavity. A head 86 is provided on the shaft, as is lubricating channel 88, similar to the previous embodiment. A spring 90 biases the shaft outwardly.

It will be noted that the opposing face member of second base member 68 is not flat with respect to the direction of shaft 84. However, the shaft is still matted flush against the surface of the base member by slanting the end of the shaft as shown. This arrangement is acceptable only so long as shaft 84 does not rotate.

Figure 4:
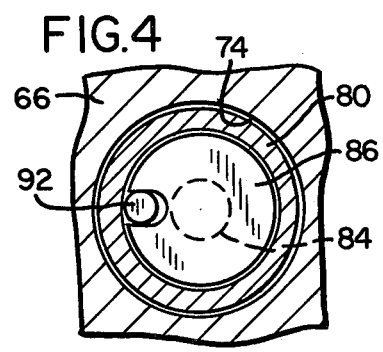
FIG. 4 is a fragmentary section taken along the line 4—4 of FIG. 3.

Accordingly, an indexing means is provided as illustrated in FIGS. 3 and 4. A pin 92 is mounted in guide 78, and extends outwardly to engage head 86 of the shaft throughout the range of its travel. This effectively secures the shaft against rotation.

Figure 5:
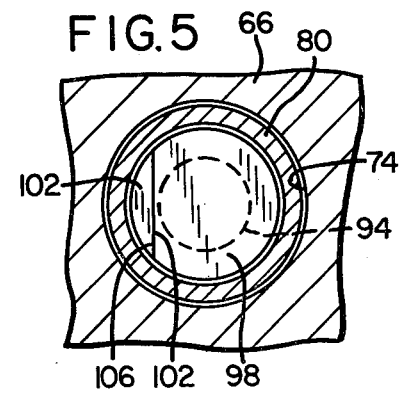
FIG. 5 is a fragmentary section similar to FIG. 4 illustrating a second embodiment of the indexing assembly.
Figure 6:
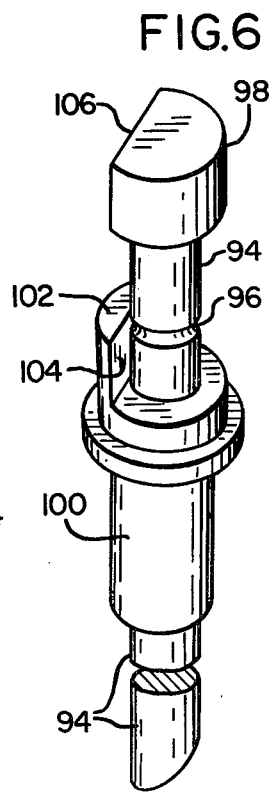
FIG. 6 is a top perspective view of the component parts of the second embodiment of the indexing means shown in FIG. 5.

FIGS. 5 and 6 illustrate a second embodiment of the indexing means. Shaft 94 is provided with a lubricating groove 96 and a head 98. A guide 100 includes an upstanding segment 102. The segment has an inwardly facing surface 104. Head 98 has a matching face 106 configured to slide against the segment. This particular embodiment is useful where there is not sufficient room on guide 78 to use a pin 92. However, it does have a drawback in that a larger area of the spring is not touching the head. Accordingly, this design is useful for small core pins while the design of FIGS. 3 and 4 is more useful for larger core pins.

OPERATION

Installation of the compensating core pin of the present invention is very simple. A stepped hole with a short threaded area is machined into the mold base. The guide, tube and shaft are machined to their proper length.

The shaft should be fitted so that it has a positive clearance when the mold is open. Preferably a clearance of plus 0.005 inch to plus 0.025 inch should be attained. This, of course, allows the die maker considerable latitude.

With any positive clearance between zero and the limits of the spring the core pin is assured of having zero clearance fit when the mold is closed.

If the opposing face is not flat with respect to the direction of the core pin, it is necessary to use an indexed core pin while the shaft has a slanted or contoured end. It is important that the seal between the end of the shaft and the opposing mold face be exact, since if it were not plastic would work under the end of the shaft and the dynamic pressure would lift the shaft away from the face.

It can be seen that a core pin is provided which greatly simplifies the problem of forming a precision hole in an injection molded part. The embodiments herein disclosed show particular applications and no limitation is intended thereby.

Having disclosed my invention in its preferred embodiment, I claim:

1. A compensating core pin for use in a plastic injection mold for forming a hole through a part as it is formed in the mold, the mold including opposing first and second base members positionable in either an open position wherein the base members are separated or in a closed position wherein the base members are together and form an injection molding cavity between the inner faces thereof, the core pin comprising:
   (a) a shaft mounted longitudinally slidably in the first base member and extending through the cavity and abutting and sealing against the inner face of the second base member when the base members are in the closed position, the shaft having constant dimension throughout the mold cavity; and
   (b) spring means biasing the shaft toward the second base member.

2. The core pin of claim 1 further comprising stop means attached to the shaft for engaging the first base member to determine the limits of extension of the shaft.

3. The core pin of claim 2 wherein the first base member has a stepped hole therein forming a shoulder and wherein the stop means comprises a head on the shaft configured to abut the shoulder and limit the forward travel of the shaft.

4. The core pin of claim 2 wherein the spring means biases the shaft forwardly so that when the mold is in the open position and the stop means engages the first base member the extension of the shaft is greater than the width of the cavity at the core pin location.

5. The core pin of claim 2 wherein the limit of extension of the shaft when the mold is in the open position is between 0.005 inch and 0.025 inch greater than the distance between the opposing mold faces of the cavity at the core pin location.

6. The core pin of claim 1 wherein the first base member includes a hole extending therethrough, the shaft being mounted in the hole with its rear end terminating within the hole, and further comprising cap means mounted in the first base member at the rear of the hole, the spring means being captivated between the rear end of the shaft and the cap means.

7. The core pin of claim 1 wherein the shaft includes a circumferential groove therein for receiving a packing of lubricating material to provide long-term lubrication between the shaft and its guide.

8. The core pin of claim 1 wherein the shaft includes an indentation on its end to increase the effectiveness of a seal against the opposing mold face.

9. The core pin of claim 1 wherein the first base member includes a stepped hole extending therethrough, and wherein the core pin further comprises a cartridge comprising:

(a) a guide configured to seat in the stepped hole and having a hole therethrough configured and dimensioned to receive the shaft in longitudinal sliding relationship;

(b) a tube extending from the guide and confining the spring means; and (c) a cap mounted in the first base member for captivating the guide, tube and spring means.

10. The core pin of claim 9 wherein the shaft further comprises a head on the end thereof configured to abut the guide to limit the forward travel of the shaft.

11. The core pin of claim 10 further comprising indexing means engaging the guide and the head for preventing rotation of the shaft.

12. The core pin of claim 11 wherein the indexing means comprises a pin mounted in the guide parallel to the shaft, and a notch in the head configured and dimensioned for engagement with the pin.

13. The core pin of claim 11 wherein the indexing means comprises a segment upstanding from the guide, and wherein the head includes a matching face configured to slide against the segment.

14. The core pin of claim 9 further comprising indexing means engaging the guide and the shaft for preventing rotation of the shaft.

15. The core pin of claim 1 wherein the inner face of the second base member is not flat with respect to the direction of the core pin, and wherein the periphery of the end of the shaft is contoured to mate with and seal against the mold face, and further comprising indexing means engaging the shaft and preventing any rotation thereof which would cause the surfaces not to mate.

* * * * *